US011620283B2

(12) United States Patent
Sidar et al.

(10) Patent No.: US 11,620,283 B2
(45) Date of Patent: Apr. 4, 2023

(54) METHOD AND SYSTEM FOR ANALYTIC BASED CONNECTIONS AMONG USER TYPES IN AN ONLINE PLATFORM

(71) Applicant: Enquire AI, Inc., Washington, DC (US)

(72) Inventors: Cenk Sidar, Potomac, MD (US); Fatih Orhan, Potomac, MD (US); Bilal Baloch, Washington, DC (US)

(73) Assignee: Enquire AI, Inc., Washington, DC (US)

( * ) Notice: Subject to any disclaimer, the term of this patent is extended or adjusted under 35 U.S.C. 154(b) by 0 days.

(21) Appl. No.: 17/379,595

(22) Filed: Jul. 19, 2021

(65) Prior Publication Data

US 2021/0349893 A1    Nov. 11, 2021

Related U.S. Application Data

(62) Division of application No. 16/243,405, filed on Jan. 9, 2019, now Pat. No. 11,068,479.

(60) Provisional application No. 62/615,343, filed on Jan. 9, 2018.

(51) Int. Cl.
| | |
|---|---|
| *G06F 16/24* | (2019.01) |
| *G06F 16/2452* | (2019.01) |
| *G06N 7/00* | (2023.01) |
| *G06F 16/903* | (2019.01) |
| *G06F 40/30* | (2020.01) |
| *G06F 40/205* | (2020.01) |

(52) U.S. Cl.
CPC .... *G06F 16/2452* (2019.01); *G06F 16/90335* (2019.01); *G06F 40/205* (2020.01); *G06F 40/30* (2020.01); *G06N 7/005* (2013.01)

(58) Field of Classification Search
CPC .................................................. G06F 16/2452
USPC ......................................................... 707/713
See application file for complete search history.

(56) References Cited

U.S. PATENT DOCUMENTS

| | | | |
|---|---|---|---|
| 6,993,517 B2 * | 1/2006 | Naito | G06F 16/33 707/E17.08 |
| 8,027,945 B1 | 9/2011 | Elad et al. | |
| 2006/0047615 A1 | 3/2006 | Ravin et al. | |
| 2009/0162824 A1 | 6/2009 | Heck | |
| 2010/0070554 A1 | 3/2010 | Richardson et al. | |

(Continued)

FOREIGN PATENT DOCUMENTS

WO    WO-2008073962 A2 *    6/2008    ......... G06K 9/00315

*Primary Examiner* — Syling Yen
(74) *Attorney, Agent, or Firm* — Perkins Coie LLP; Lena Petrovic; Louis Yang

(57) ABSTRACT

Introduced here are various embodiments for selectively assigning a query to an expert. A network-accessible server system may receive a query from a client device indicating a question or project proposal. The query text may be parsed and attributes of the query may be determined by inspecting the parsed query text. The query attributes may be compared with attributes associated with a pool of experts with various specialties and expertise in various fields. The network-accessible server system may match the query attributes with attributes associated with a first expert with a similarity that exceeds a threshold similarity level to identify that an expertise of the first expert matches the requested expertise in the query. The first expert may be assigned to the query and prompted to provide a response to the query.

20 Claims, 6 Drawing Sheets

(56) References Cited

U.S. PATENT DOCUMENTS

| | | | |
|---|---|---|---|
| 2011/0313932 A1* | 12/2011 | Bhandar | G06Q 10/06 |
| | | | 705/348 |
| 2013/0132308 A1 | 5/2013 | Boss et al. | |
| 2015/0281454 A1 | 10/2015 | Milstein et al. | |
| 2016/0071162 A1* | 3/2016 | Ogawa | G06Q 50/01 |
| | | | 705/14.66 |
| 2016/0085743 A1 | 3/2016 | Haley | |
| 2016/0196110 A1 | 7/2016 | Yehoshua et al. | |
| 2016/0259789 A1* | 9/2016 | Shrinath | G06F 16/24578 |
| 2017/0262529 A1 | 9/2017 | Chim et al. | |
| 2018/0337935 A1 | 11/2018 | Marwah et al. | |

* cited by examiner

METHOD AND SYSTEM FOR ANALYTIC BASED CONNECTIONS AMONG USER TYPES IN AN ONLINE PLATFORM

CROSS-REFERENCES TO RELATED APPLICATIONS

This application is a divisional application of U.S. patent application Ser. No. 16/243,405, titled "METHOD AND SYSTEM FOR ANALYTIC BASED CONNECTIONS AMONG USER TYPES IN AN ONLINE PLATFORM," and filed Jan. 9, 2019, which claims priority to U.S. Provisional Patent Application No. 62/615,343, titled "METHOD AND SYSTEM FOR ANALYTIC BASED CONNECTIONS AMONG USER TYPES IN AN ONLINE PLATFORM," and filed on Jan. 9, 2018, both of which are hereby incorporated by reference in its entirety.

TECHNICAL FIELD

The present application is related to online platforms and, more specifically, to a method and system for selectively assigning a query to an expert over a networked environment based on identified attributes of the query.

BACKGROUND

Prior to the advent and prolific use of distributed network environments such as the Internet, a person looking for an expert in a particular field would review a static directory (e.g., a telephone directory). A static directory does not account for changes in information relating to a user or an expert.

With the advent of distributed networks, social platforms now enable users to connect based on static user information typically entered by a user. Static information employed for connections is often out-to-date resulting in inaccurate or incorrect connection recommendations. In addition, many social platforms include privacy settings that limit a user's ability to identify another user with particular expertise indicated on a profile.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
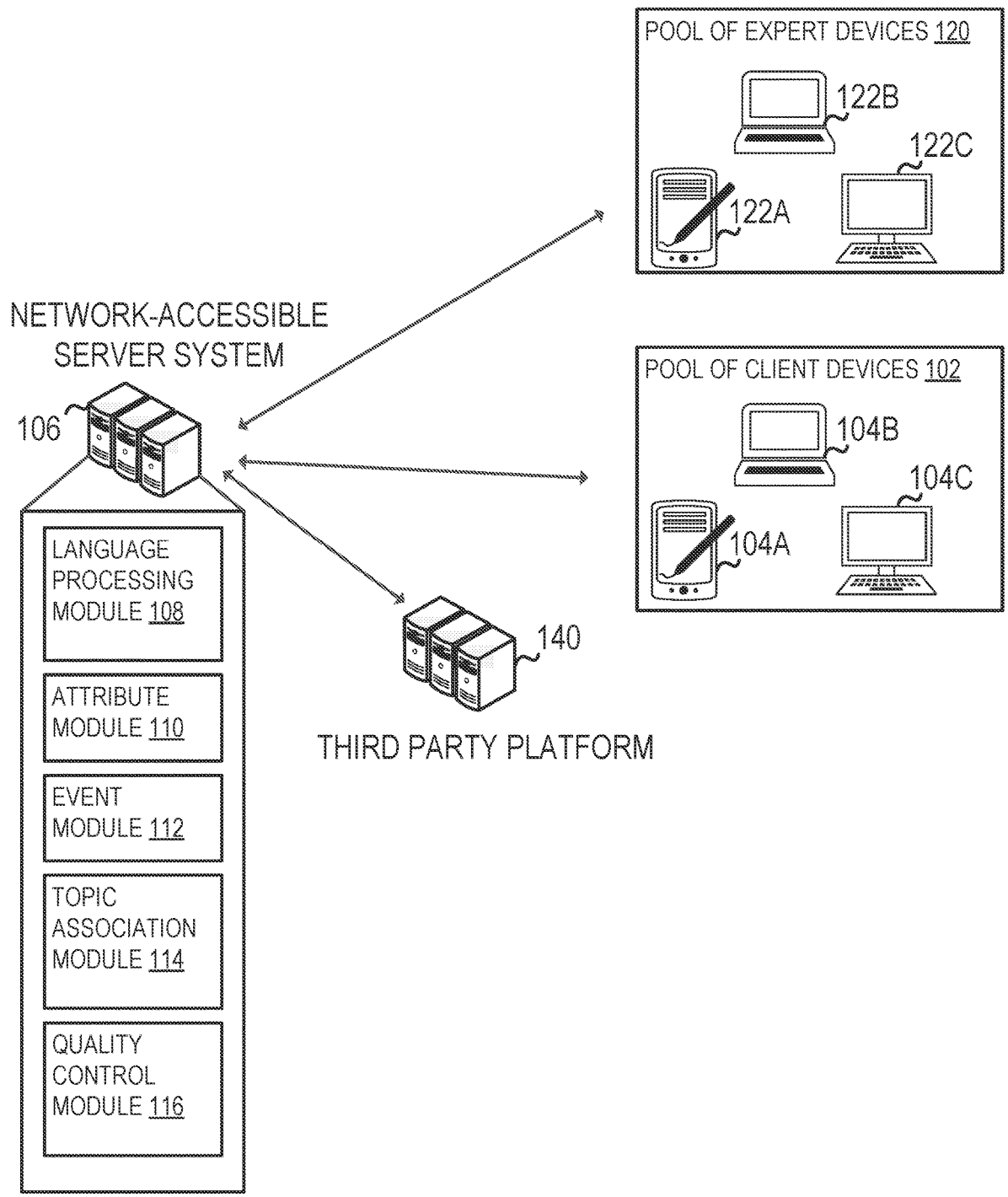
FIG. 1 depicts an illustration of a system to selectively distribute a query to an expert, consistent with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

In many cases, individuals would like to learn more about a given subject. As an example, for illustrative purposes, an individual may want to learn more about policies relating to renewable energy (solar power, wind power, etc.) in Europe. To find such information, the individual may conduct research (e.g., read books, read newspapers, speak with another individual, etc.).

In some instances, an individual may attempt to identify an expert to answer a question or prepare a report on a topic. Experts may possess a particular expertise or specialty in various fields. For example, an expert can have an expertise in Chinese linguistics, or a specialization in European policies relating to renewable energy.

An individual may identify an expert in a field using various methods. For example, an individual may use a phonebook to find an expert. In some cases, an individual may identify an expert by searching for experts and other relevant information over a networked environment (e.g., the internet).

However, identifying experts in specialized fields may be computational resource-intensive. For example, an individual may interact with many individuals over a networked environment that have insufficient knowledge on the relevant field of specialization. Further, computing devices may exhaust a great amount of computation resources in searching third-party platforms for relevant information on potential experts and transmitting information in the networked environment that may lead to inefficient operations of computers in a networked environment.

In many cases, to understand more about a topic and/or to perform research on a topic (e.g., policies relating to renewable energy (solar power, wind power, etc.) in Europe), an individual may refer to information over the internet. For example, an individual may access blog posts, scholarly articles, news articles, online discussions, social media posts, etc., relating to a question. For example, a news article may outline a new solar power policy enacted in a European country. Such information accessed by an individual may be static (i.e., a blog post is written and posted once without further updating of the blog post).

However, due to various circumstances (e.g., time, change of laws, inaccurate information provided, etc.), the static information may become inaccurate or out of date. For example, a social media post recommending a restaurant in a city may be inaccurate if the restaurant goes out of business after the posting of the social media post. In addition, many social platforms include privacy settings that limit a individual's ability to identify another individual with particular expertise indicated on a profile.

Accordingly, techniques to selectively distribute a query is disclosed. A client may transmit a query (or "question") to a network-accessible server system. An example of a query may be "What are linguistic differences across regions in Italy?" The network-accessible server system may identify the nature of the query and assign keywords (or "query attributes") to the query. In the example above, query attributes may include "linguistic," "differences," "regions," "Italy," etc. The network-accessible server system may identify an expert with a specialization in a relevant field to handle the query by matching the query attributes with specialties (or "expert attributes") of the expert. In the present example, the network-accessible server system may assign the query to a first expert with specialties in Italian linguistics and accents. In some embodiments, the first expert may be prompted to respond to or provide an opinion on an event (e.g., a breaking news article) relating to the query. Based on assigning the query to the expert, the expert may answer the query for the client or provide their expert opinion on the relevant topic.

The present disclosure may include determine attributes of a query identifying the meaning of the query, determine attributes of experts relating to their specialty, and determine attributes of events (e.g., news articles, blog posts, etc.) to identify the meaning of the event. Based on a determinization that there is a threshold similarity between the attributes of the query and the attributes of an expert, the network-accessible server system may selectively assign the query to the expert for the expert to provide an accurate response/opinion based on the query. This may improve the functionality of the computer network, as the network-accessible server system may increase computational efficiency by selecting an expert for a query with greater accuracy based on previously determined attributes of the expert. This may lessen the chances of the network-accessible server system assigning the query to multiple, less accurate, experts to handle the query.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

System Overview

FIG. 1 depicts an illustration of a system to selectively distribute a query to an expert, consistent with various embodiments. The system 100 may include a pool of client devices 102 that includes multiple electronic devices (e.g., mobile phone 104A, laptop computer 104B, desktop computer 104C), where each electronic device is associated with a client. A client, via a client device (e.g., desktop computer 104C) may transmit a query (e.g., "request to generate a recent history of policies relating to renewable energy (solar power, wind power, etc.) in Europe, etc.) to a network-accessible server system 106.

A network-accessible server system (or "online platform") 106 may receive a query (e.g., questions, project proposals, etc.) from client devices 104A-C included in the pool of client devices 102. Upon receipt of a query from a client device (e.g., laptop computer 104B), the network-accessible server system 106 may parse and analyze the query to determine the meaning/nature of the query using a language processing module 108.

The language processing module 108 may identify text (words, phrases, etc.) based on content included in the query. The language processing module can use natural language processing (NLP) to identify text and/or parse the query to build a parse tree using a probabilistic context-free grammar and employing lexical semantics to derive a meaning of the query. In other words, the language processing module 108 can parse identified text in the query using a parse tree to identify keywords that identify the nature of the query. For example, if a query is for "restaurant suggestions in Australia," the language processing module can identify and understand the meaning of the words "restaurant," and "Australia."

Based on the text identified in the query, an attribute module 110 may identify attributes of the query. Attributes may include keywords, codewords, features, phrases, etc., that indicate an attribute of the query text. For example, the attribute module 110 may identify the words "Australia," and "restaurant," where the attribute module 110 may determine that the query relates to an expert opinion on restaurants in Australia The attribute module 110 may identify various keywords representing the expertise (or "attributes") of an expert. The pool of expert devices 120 may include 122A-C that each are associated with an expert. As an example, attributes associated with a Chinese linguistics expert associated with mobile phone 122A may include expert attributes such as "China," and "Language."

The network-accessible server system 106 may identify a first expert by comparing query attributes and the attributes of the expert(s). For example, if a query includes attributes relating to "Europe," "renewable energy," and "policy," a European renewable energy policy expert with identified attributes of "Europe," "renewable energy," and "policy" may be the first expert identified. In some embodiments, this determination may include inspecting an attribute node graph (discussed in FIG. 3) to determine a similarity (or "closeness") between the identified event and the pool of experts.

Using the attributes of the query identified by the attribute module 110, the network-accessible server system may identify an event (e.g., report of a natural disaster, a new law passed by a government, the opening of a restaurant, etc.) using an event module 112. The event module 112 may access and search (or "mine") third-party platforms 140 (e.g., social media pages, blog posts, news organization websites, scholarly articles, etc.) to identify an event in real-time. For example, the event module 112 may identify a newly-passed policy in a European country relating to wind power regulation from a news organization posting a bulletin about the policy.

In some embodiments, the event module 112 may determine a relevancy score for each identified event. A relevancy score may include a determination of the relevancy of an event identified by a network-accessible source. The relevancy score may be based on various factors, such as the impact on relevant individuals, the impact on economic interests, the impact on rights of individuals, etc. For example, an event indicating a natural disaster impacting millions of individuals in a populated country may receive a greater relevancy score than an event indicating a cancellation of a local sporting event due to the natural disaster's greater impact on a larger number of individuals. In an embodiment, the relevancy score may be compared against a threshold level to determine whether the event is considered a major event (e.g., an event with widespread impact).

As an example, each event identified can be given a relevancy score of a number between 0 and 100. Furthering this example, using various factors, an event indicating a major natural disaster may be given a relevancy score of 85, which indicates widespread impact among a large number of individuals. If a predetermined threshold level is 65, the relevancy score (85) exceeds the threshold level (65). Accordingly, in this example, the event identified may be considered a major event. In some cases, the language processing module 108 may parse and analyze all major events to discern keywords and text from the event. Based on the keywords identified, the attribute module 110 may identify attributes associated with the major event.

With attributes identified for an event and attributes identified for a query, the network-accessible server system 106 may identify an expert with an expertise similar to the identified attributes. The network-accessible server system 106 may communicate with a pool of expert devices 120 (e.g., mobile phone 122A, laptop computer 122B, desktop computer 122C) associated with an expert. For example, a Chinese linguistics expert may be associated with mobile phone 122A, an Australian travel expert may be associated with laptop 122B, and a European renewable energy policy expert may be associated with desktop computer 122C.

The network-accessible server system 106 can generate a prompt to an expert identified based on similar attributes between the expert and the event. A prompt may include a request for the expert to provide an opinion of an event (e.g., press release of a new law), respond to a query, generate a project, etc.

In an embodiment, the network-accessible server system 106 may include a topic association module 114 to predict a topic of interest of an individual (e.g., clients) based on data received from client device(s) 104A-C. For example, the topic association module 114 can extract client data from a calendar entry, an email, a text message, a detected location, etc. from a client device (e.g., mobile phone 104A) to determine potential topics of interest of the client. In an example, the topic association module 114 may identify a potential interest of a location (e.g., Australia) based on emails and calendar entries indicating a future trip to Australia. In an embodiment, if a major event associated with the location is identified during a time in which the client is in that location, for example, a notification can be automatically generated and sent to the client indicating of the major event.

Based on an identified expert receiving a prompt and responding to the prompt, the response may be transmitted to the appropriate client device in the pool of client devices 102. For example, a response to a query may be transmitted to a device (e.g., laptop computer 104B) that transmitted the query.

A quality control module 116 can review the responses provided by expert(s) and rate the responses. The responses can be rated based on characteristics of the response, such as grammar, accuracy, response time, etc. In an embedment, each expert may have an associated expert rating indicating an average rating of all responses provided. The quality control module 116 may filter responses provided by experts so that only responses with a rating above a threshold level are transmitted to a client device. For example, if a response is given a rating below the threshold level, the quality control module 116 may generate a notification indicative of the deficiency for the expert that generated the response. If the response receives a rating above the threshold, the quality control module 116 can provide the response to any relevant client device(s) 104A-C.

In some embodiments, data validation and attribute rules can be used to flag responses received from experts to ensure clarity and accuracy of responses. These rules can include analyzing, for example, spelling, grammar, keyword matches, tonal characteristics, etc. Spelling analysis can automatically correct misspelled words based off a mismatch against a dictionary library file. Grammar analysis can involve identifying incorrect and/or awkward grammatical usage within response field. Keyword match analysis can involve examining a response from an expert for particular keywords (e.g., keywords associated with a broader keyword library and/or parse tree derived from the query). A threshold (i.e. 30%) can be used to determine whether the expert is addressing the subject for which the client has provided a query. Tonal characteristics analysis involves collecting data from a plurality of query transactions to determine if a response includes characteristics that will likely receive higher or more favorable client ratings. Examining characteristics of responses in a response library that have a rating enables an additional validation of characteristics of a currently submitted response. A threshold characteristic correspondence is determined to flag a particular response that is not likely to receive a positive client rating.

Suggestions can be automatically generated for an expert based on the tonal analysis. Suggestions indicative of characteristics of highly rated responses are generated in real time and provided to an expert in response to determining that a response from the expert falls below a threshold characteristic correspondence. The automated suggestions can guide experts on characteristics that result in highly rated responses.

In an embodiment, manual quality control can be implemented in lieu of or in addition to automated quality control. For example, manual quality control can be implemented to review responses flagged by the automated quality control system. If a submitted answer does not exceed a threshold based on the validation rules of the automated quality control system, the response can be added to a manual review queue. The quality control module 116 can enable a manual reviewer to select a discard option to cause the response to be discarded or to select a revision option to cause the response to be sent to the originating expert for revision and eventual resubmittal. Special cases may exist where the content of the response is deemed to be high quality but lacking clarity. The quality control module 116 can enable a manual reviewer to select an editor review option to cause the response to be delivered to an editor to improve clarity.

In an embodiment, responses can be randomly or quasi-randomly reviewed. For example, on a periodic basis, a sample of responses can be randomly pulled from the system and reviewed. The random review can verify that automated attribute-specific and validation rules are working appropriately. Random review can also be used to identify any trends or unique events that may warrant further investigation.

Figure 2:
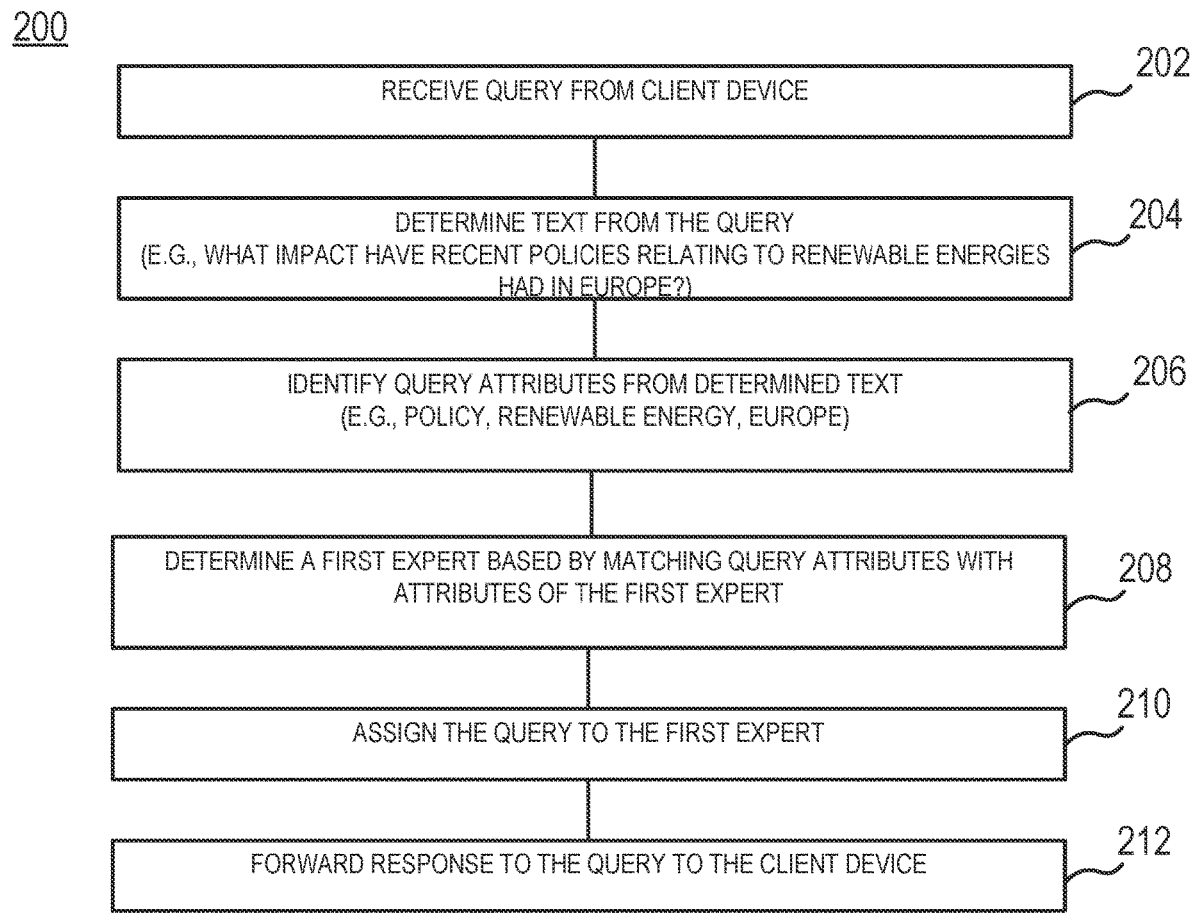
FIG. 2 illustrates a flow process to selectively distribute a query to an expert, consistent with various embodiments

FIG. 2 illustrates a flow process 200 to selectively distribute a query to an expert, consistent with various embodiments. A network-accessible server system may receive a query from a client device (block 202). The network-accessible server system can receive multiple queries from various client devices, where each query may represent a question or a project proposal for a relevant expert.

The network-accessible server system can determine text from the query (block 204). In other words, the network-accessible server system can parse the query to identify characters in the query and analyze the identified characters to determine text. Identifying text can include utilizing a text recognition technique, such as Optical Character Recognition (OCR), for example. The query can be parsed into text by implementing natural language processing to identify text. For example, the network-accessible server system can determine that a received query includes the following text: "What has been the impact of recent policies relating to renewable energies in Europe?"

Based on the determined text of the query, the network-accessible server system may identify attributes of the query (or "query attributes") (block 206). Query attributes may include keywords or features of the query text that can identify the nature or meaning of the query. For example, with the query "What has been the impact of recent policies relating to renewable energies in Europe," the network-accessible server system may identify "Policies," "renewable energies," and "Europe," as the primary keywords that give meaning to the query. In some embodiments, the network-accessible server system may utilize a parse tree to parse the text and utilize the parse tree to determine relevancy of the query text to determine the primary keywords that may include query attributes.

In some embodiments, the network-accessible server system may access a client profile associated with a client. A client profile may include a set of data representing information relating to the client, such as client contact information, client professional information, previous queries provided by the client, etc. In an embodiment, the network-accessible server system may update a client profile to include query attributes of a query transmitted by a client device associated with a client. In other words, if a client logged into a client device transmits a query, the identified query attributes may be included in the client profile. Based on the attributes associated with a client profile, relevant events and event reports generated by the network-accessible server system may be forwarded to the client profile if attributes of the event match any attributes included in the client profile.

The network-accessible server system may identify a first expert based on determining that the query attributes match attributes of the first expert (block 208). The network-accessible server system may access a pool of experts, where each expert has individual specialties or fields of expertise. Each expert may have associated attributes that represent their field(s) of specialty. For example, if the first expert is a Renewable Energy expert for European countries, attributes of the first expert may include "Renewable Energies," "Europe," etc.

Figure 3:
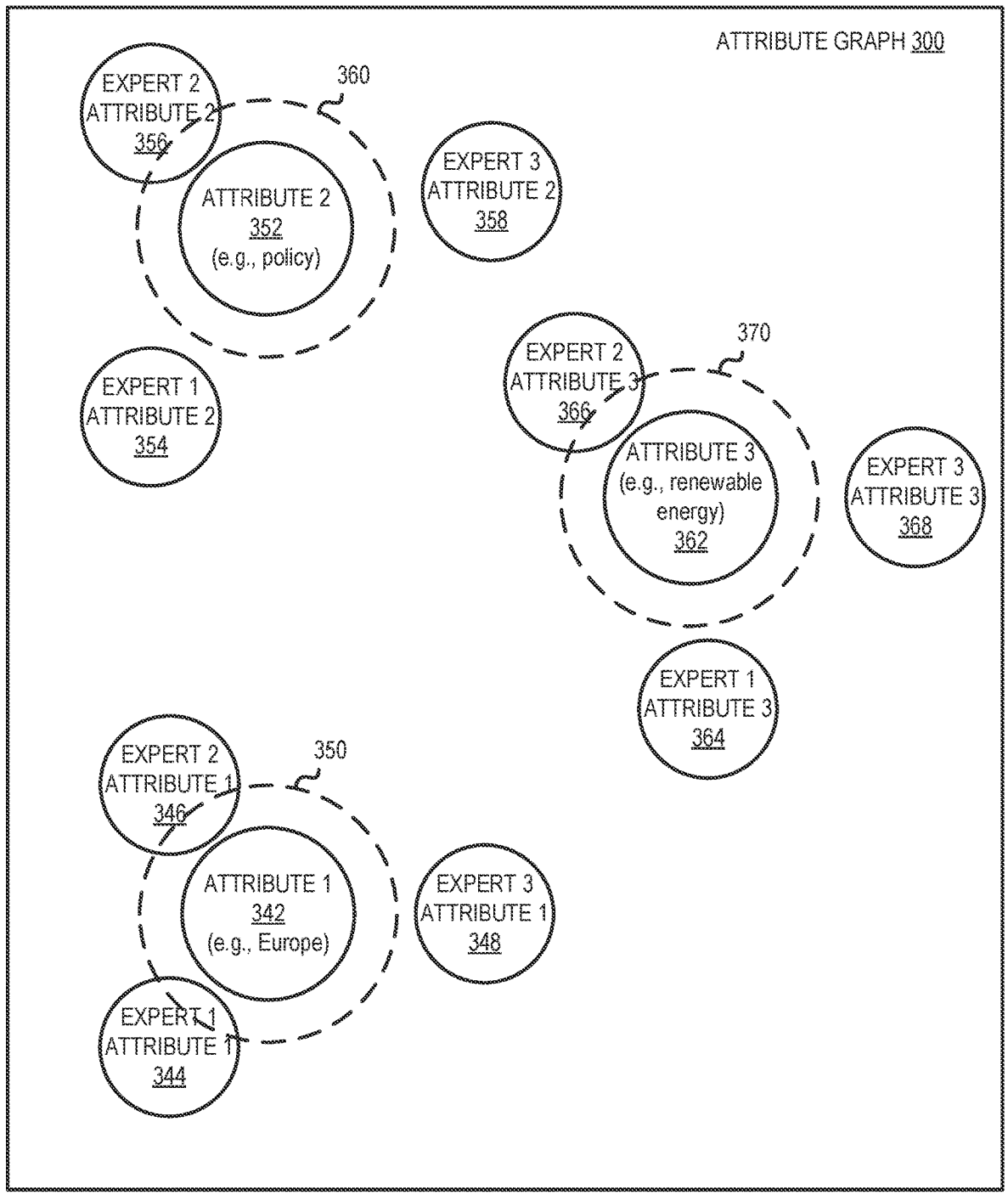
FIG. 3 depicts an illustration of an attribute graph, consistent with various embodiments.

Matching the attributes of expert(s) with the query attributes may include determining a similarity between these attributes. In some embodiments, this matching may be determined by an attribute graph, as shown in FIG. 3. The network-accessible server system may compare the attributes of each expert (e.g., first expert) against the query attributes to determine whether the similarity exceeds a threshold similarity level. A threshold similarity level may include a predetermined threshold or minimum amount of similarity to determine that expert attributes match the query attributes. In an embodiment, attributes can be plotted on a Cartesian coordinate system (i.e. x,y plot), and a Euclidean distance function can be used to determine how "close" or "similar" each expert attribute to an attribute of the query.

Using each of the distance calculations, in combination with their weights, a combined "score" may be calculated which indicates an overall match metric between a query attribute and an attribute of an expert. A combined score can be derived from the sum of the Euclidean distances (e.g., for each of the experts' attributes relative to the client) multiplied by the weight assigned to that attribute. The combined score can be based on historical data from completed connections to increase weight of attributes more relevant to determining similarity. Actual observations (i.e. completed connections) can be analyzed by performing a distance calculation using techniques such as, for example, k-Nearest Neighbors (k-NN). A rank order of a number of matching experts (e.g., the top 10 or 15 experts) can be generated based on the match metric. The ranked order of matching experts can be provided to a client for the client to select any of the experts included in the rank order list.

In some embodiments, a plurality of experts (e.g., a first expert and a second expert) may have attributes that match the query attributes with the threshold level of similarity. In this event, an expert (e.g., first expert) may be assigned the query based on a factor (e.g., average time to complete a task, expert rating, workload, etc.). In an embodiment, the client device associated with the client that transmitted the query may receive a listing of all relevant experts (i.e. experts with attributes that match the query attributes). The listing may include information about all relevant experts, such as contact information, expert location, expert education, expert experience, etc. Based on this listing, the client device may transmit a communication to the network-accessible server system indicating a selected expert.

Based on determining that attributes of the first expert match the query attributes with a similarity that exceeds a threshold similarity level, the query may be assigned to the first expert (block 210). Assigning the query may include prompting the expert to provide a response to the query. For example, for a query of "What has been the impact of recent policies relating to renewable energies in Europe," the first expert may respond to this query by providing relevant policies and a summation of the overall impact of these policies, as this query is within the specialty of the first expert. In some embodiments, the query may include a request to generate a project or report on a topic, and the first expert may respond to such a query by providing a project or report on the topic.

The network-accessible server system may forward a response to the query to a client device associated with a client (block 212). The response may be forwarded to the client device that originally transmitted the query to the network-accessible server system. In some embodiments, the response may be forwarded to all client devices that transmitted queries with a query attribute similar to an attribute of the response. For example, if a response to a query includes a summation of travel locations in Australia, all client devices that submitted queries relating to travelling in Australia may receive the response generated by the expert.

FIG. 3 depicts an illustration of an attribute graph 300, consistent with various embodiments. An attribute graph 300 may include a graphical representation of attributes of the query and attributes of a pool of experts to determining whether attributes of an expert are similar to an attribute of a query and/or an event. In this representation, the closer in proximity an expert attribute (e.g., expert 1 attribute 1 344) is to a query attribute (e.g., query attribute 1 342), the more similar the expert attribute is to the query attribute.

In an example, the query is "What has been the impact of recent policies relating to renewable energies in Europe," where the network-accessible server system identifies the following attributes: "Europe," (e.g., attribute 1 342) "policy," (e.g., attribute 352) and "renewable energy," (e.g., attribute 362). Looking at attribute 1 342 (e.g., "Europe"), each expert attribute may be inspected to determine a similarity of the expert attribute to attribute 1 342.

Furthering the above example, each attribute (e.g., 342, 352, 362) may be compared with expert attributes to determining a similarity to the attribute. Looking at attribute 1 342 (e.g., "Europe"), this may be compared with expert attributes 344, 346, 348 correlated with three different experts. For example, a first attribute of a first expert 344 may be "Italy," a first attribute of a second expert 346 may be "Germany," and a first attribute of a third expert 348 may be "Australia."

As can be seen in FIG. 3, a first attribute of a first expert 344 and a first attribute of a second expert 346 are within a threshold similarity 350. Because the attribute is "Europe," all European countries may be included and similar to the attribute within a threshold level. For example, Italy (expert 1 attribute 1 344) is a European country and is similar to the attribute of Europe. Accordingly, Australia (Expert 3 attribute 1 348) is not a European country and is not similar within the threshold level 350.

In some embodiments, determined attributes of event(s) may be plotted on the attribute graph 300. A proximity on the attribute graph between a first query attribute and a first event attribute may indicate a similarity between the first query attribute and the first expert attribute.

Figure 4:
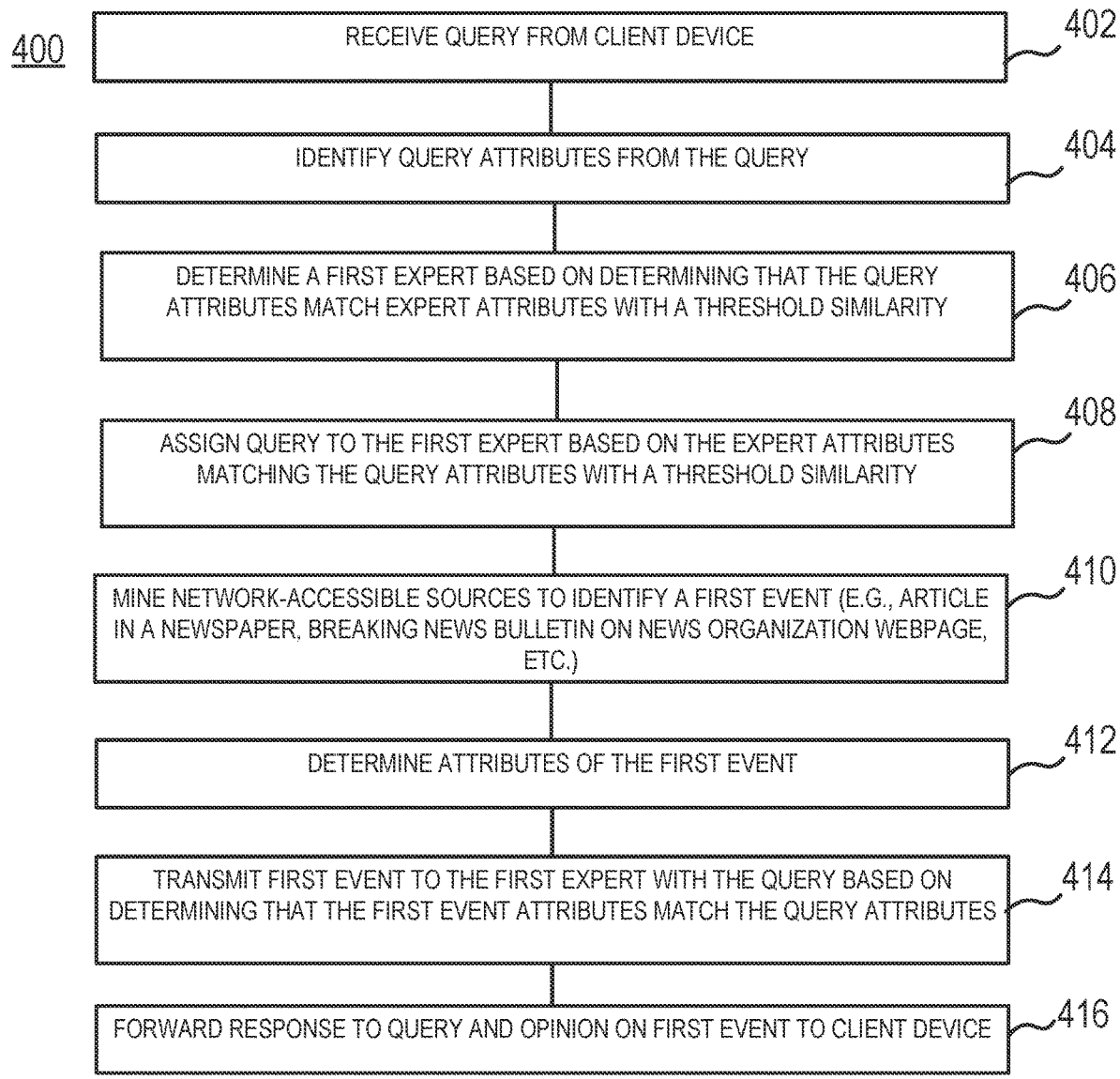
FIG. 4 illustrates a flow process for selectively distributing a query and an event, consistent with various embodiments.

FIG. 4 illustrates a flow process 400 for selectively distributing a query and an event, consistent with various embodiments. Once the network-accessible server system receives a query (e.g., a question and/or a project proposal) from a client (block 402), the network-accessible server system can use keyword analysis and/or natural language processing to analyze the query (block 404). The network-accessible server system can match the query with an expert by quantifying a similarity or closeness between the attributes of the query and the identified specialties of the expert (block 406).

Similarity can be measured via keywords associated with a client profile associated with a client that transmitted the query, keywords identified through parsing query descriptions (e.g., project and/or question descriptions), keywords associated with a profile of an expert, previous projects and/or responses executed by the expert, etc. These keywords may be identified through a primary and secondary keyword library based on regional and subject matter expertise. An individual client and their project are analyzed to identify a closest match (e.g., via an attribute graph). An expert may be identified as having a greatest closeness is selected based on a set of common attributes.

Potential attributes can be identified based on a keyword percentage calculated by analyzing a ratio between a number of keywords identified in an expert profile and a number of keywords in a project description and in a client profile. Keywords may be parsed from the project description and then tagged as project keywords in order to differentiate from profile keywords. The project keywords can be weighed differently than the profile keywords. Differential weighting for project keywords can result in a preference for experts having keywords identified in previous project(s) over experts having keywords identified in a profile. For example, a weighting of 0.80 for project keywords and a weighting of 0.20 for profile keywords can be used. In another example, a weighting of 0.70 for project keywords and a weighting of 0.30 for profile keywords can be used.

The query may be assigned to the first expert based on the attributes of the first expert matching the query attributes (block 408). In some embodiments, a relevant event (e.g., blog post, social media post, news organization article, etc.) that is relevant to the query may be identified and transmitted to the first expert.

The network-accessible server system may mine (or "inspect") network-accessible sources to identify a first event (block 410). The network-accessible server system may mine servers, webpages, blogs, etc., to identify various events (e.g., news posts, social media posts, articles, publications of academic studies, etc.).

The network-accessible server system may determine keywords (or "event attributes") of the first event (block 412). In some embodiments, natural language processing may be applied to a description associated with the first event by parsing the first event to build a first event parse tree using a probabilistic context-free grammar and employing lexical semantics to derive a meaning of the first event. In other words, a parse tree for the event may be utilized to identify keywords or attributes of the first event. For example, a first event indicating a natural disaster in a country may include event attributes relating to the type of natural disaster, the location of the event, and the impact of the event. In an embodiment, the network-accessible server system may compare the first event parse tree with a repository of known attribute keywords to determine event attributes of the first event.

The network-accessible server system may transmit the first event to the first expert with the query based on determining that the first event attributes match the query attributes (block 414). If the first event (e.g., a report of a new law passed in Country A) is similar to the query (e.g., a question relating to new laws passed in Country A), the first event may be sent to the expert along with the query for the first expert (e.g., an expert on legislation in Country A. Upon receipt of the query and the first event, the expert may provide an expert opinion on both the query and the first event along with any impact the first event may have on the query. For example, the first expert may illustrate what the new law will impact in Country A.

Upon receipt of the response to the query and an opinion of the first event by the first expert, the network-accessible server system may forward the response and opinion to the client device (block 416).

In some embodiments, an event report may be generated that summarizes an event and opinions received relating to the event. The event report may include an event (e.g., article of a new law passing in a Country) or a description of the event (e.g., "New Law Passes in Country"). The event report may also include an opinion provided by one or more experts. For example, with an event of a new law passing in the country, multiple experts (e.g., 5 experts) with a relevant expertise may provide an overview of the law and a projected impact of the law on the Country, the region, and/or the world.

The event report may be forwarded to a client device associated with a relevant client. A relevant client may include a client that transmitted a query with attributes similar to that of the attributes of the first event. For example, if a client device transmits a query relating to the impact of new renewable energy laws in Europe, and if an event report is generated for an event relating to a new renewable energy regulation in Europe, the network-accessible server system may forward the event report to the client. In some embodiments, all client profiles may be inspected to determine whether any client profiles include attributes that match an attribute of the event summarized in an event report, where these relevant client profiles or devices associated with the client profiles may be forwarded the event report.

Figure 5:
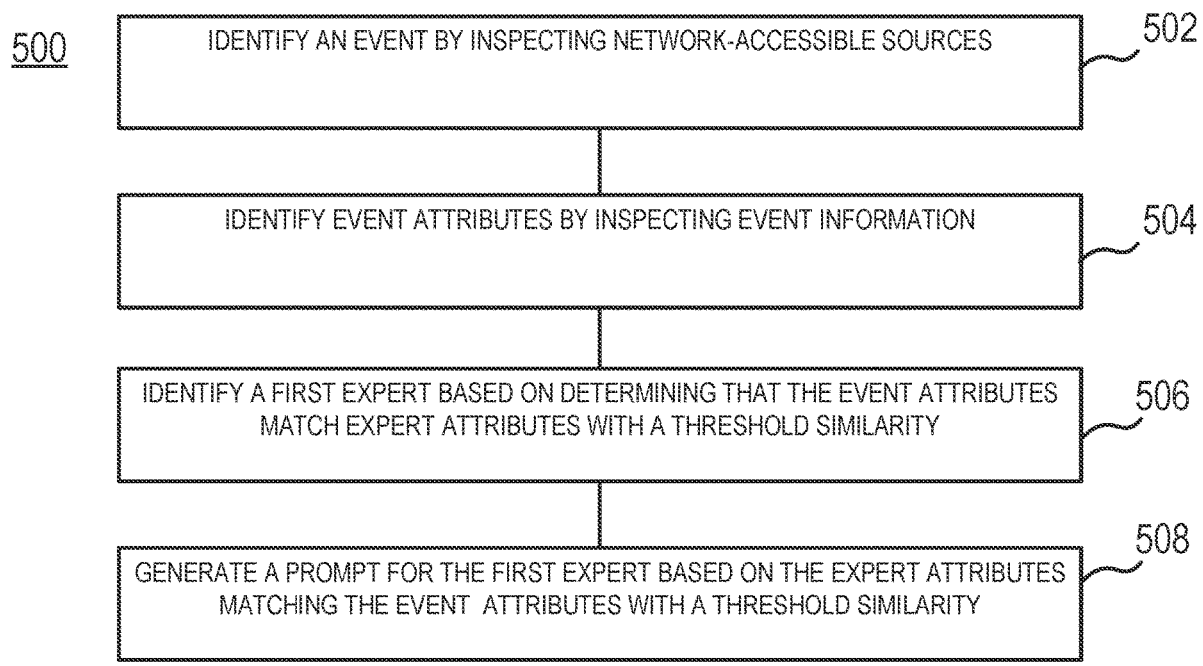
FIG. 5 illustrates a flow process for selectively distributing a prompt to provide an opinion on a first event, consistent with various embodiments.

FIG. 5 illustrates a flow process 500 for selectively distributing a prompt to provide an opinion on a first event, consistent with various embodiments. Data may be mined from various network-connected sources (e.g., news websites, social media, etc.) to identify an event (block 502). Data may be mined from open source data sources via a network (e.g., the internet).

The network-accessible server system may determine attributes of the event (block 504). In some embodiments, the network-accessible server system may determine attributes for a plurality of events mined from various sources. The network-accessible server system may parse text of each event to determine features of the event using a suitable text recognition technique.

In an embodiment, the network-accessible server system may inspect mined information relating to an expert or information relating to a client to predict information relating to the expert and/or client. For example, if mined information relating to a client indicates that the client is researching a specific topic by accessing specific webpages, the network-accessible server system may preemptively generate a query for the client and identify relevant experts based on the attributes of the query. The network-accessible server system may identify tendencies or topics of interest (e.g., sports, politics, etc.) of the client and/or the expert based on mined information relating to that client and/or expert (e.g., internet browsing history, social media posts, communication on a forum, etc.)

In some embodiments, an event relevancy score of the first event may be determined to identify a relevancy of the first event. In other words, an event relevancy score may indicate the impact and relevancy the first event has on individuals, such as a client. The event relevancy score may be determined by inspecting the event attributes of the first event and a number of instances of the event attributes. Various factors may be weighed in determining a relevancy score, such as number of instances of the event, the type of event, the impact the event has on the client, etc. In an embodiment, these factors may be weighted on a point-scale that indicates a relevancy of the first event.

In some embodiments, the event relevancy score may be compared against a threshold relevancy level to indicate that the event is a major event. A major event may indicate an event that has an impact on the client. For example, an event of a natural disaster that impacts a geographic region similar to a region identified in an attribute of a query may be a major event that has impact on the client that transmitted the query. Based on determining that an event relevancy score exceeds a threshold, a prompt to the first expert may include a request to provide an opinion on the first event. For example, an expert can provide an opinion on the event or provide a prediction on how the event will impact the client.

Distinguishing between events to determine a major event may not necessarily be binary (i.e. "typical" vice "major"). Different clients are associated with different criteria or thresholds for what qualifies as a "major event." A spectrum upon which to gauge the urgency of events is used to determine whether to label an event as a "major event" for particular clients.

By using mined datasets, major events can be determined by, for example, identifying a global activity spike and/or identifying a regional activity spike. For example, if a breaking news item correlates with a certain threshold of social media sharing this may indicate a significant event. Quickly alerting (via mobile update or email) clients and experts associated with the event topic and then seeing if a spike in activity occurs regarding that event through user activity on the online platform enables the system to determine whether to label the event as a "major event." If a spike is detected in a topic or region from a niche group of clients, an alert (e.g., a push notification) can be generated for other clients (e.g., clients more remotely associated with the topic) to the "hot" activity to make them aware of an opportunity they may not have otherwise seen. These spikes can be validated by open and/or external sources. Automating the processes allows responses to occur as close to real time as possible.

In some embodiments, a plurality of events are identified and each event is inspected to determine attributes for that event. For example, the network-accessible server system may identify multiple reports/posts relating to a new law being passed in a country. Based on the number of instances of an event identified (e.g., multiple reports on a new law being passed), that event may be considered to be a major event. In an embodiment, if the number of instances of the event passed a predetermined number or threshold, that event may be deemed a major event. A push notification may be transmitted to a client device indicating the major event based on matching attributes of the major event with the query attributes. For example, if a query transmitted by a client device includes a request for information about new laws in a country, a major event of a new law passed in that country may be sent to the client device via a push notification.

The network-accessible server system may identify a first expert based on determining that the event attributes match expert attributes with a threshold similarity (block 506). In some embodiments, expert attributes may be determined based on receipt of an input from an expert device providing information indicating the expertise or specialty of the expert. The expert may provide an expert profile to the network-accessible server system that includes the expert attributes of the expert.

In some embodiments, the network-accessible server system may mine network-accessible sources to identify the specialties and expert attributes of the expert. Examples of sources of expertise of the expert can include authored articles/papers, social media pages, degrees received, prior work experience, etc. For example, at article authored by an expert relating to renewable energy technologies may be mined and inspected discover that the expert has an expertise in renewable energy technology.

An expert may include a workload that indicates the availability of the expert. For example, a schedule of an expert may indicate that 90% of the expert's schedule is scheduled for the expert to respond to queries by various clients. The network-accessible server system may inspect a schedule or other listing of the expert's workload to identify an availability of the expert. In some embodiments the distribution of a query to an expert may be based on the availability of the expert. As an example, if a first expert and a second expert both have attributes that match the query attributes and the first expert has a greater availability than a second expert, the network-accessible server system may assign the query to the first expert based on the availability of the first expert.

In some embodiments, the network-accessible server system may identify an average response time for an expert that indicates the average time for the expert to respond to a query. The time to respond may be measured from assigning the query to the expert or generating a prompt to the expert to answer the query until receipt of the response. Upon completion of a response to a query, the network-accessible server system may update the average response time of the expert to include the recently-received response from the expert. In an embodiment, if multiple experts have attributes that match the query attributes with a similarity that exceeds the threshold, the expert with a faster average response time may be assigned to the query.

The network-accessible server system may generate a prompt for the first expert based on the expert attributes matching the event attributes with a threshold similarity (block 508). Questions to experts can be deployed via, for example, a prompt with a text field, a tailored survey, etc. A text field response can be provided where the first expert can describe the impact of the event based on their regional and/or subject matter expertise. The collection of these responses can be used to summarize impact across regions and subjects. In an embodiment, a tailored survey having an ordinal scale of significance related to a topic of an event can be generated for the first expert. Expert data from the tailored survey can be compiled and summarized using statistical analyses to inform clients of expert perceptions on the first event. A third or hybrid option could also be available including a mix of ordinal scales and free text responses. Various data products can be produced from these responses. The products can be used to provide general outlooks or dive into a niche industry, area, or geography given the quantity and quality of data available regarding expert responses.

In some embodiments, the prompt to the first expert may include a request to schedule a time to call or meet with a client associated with an event and/or a query. In another embodiment, the prompt may include a request to provide a detailed report on a query and/or event.

Processing System

Figure 6:
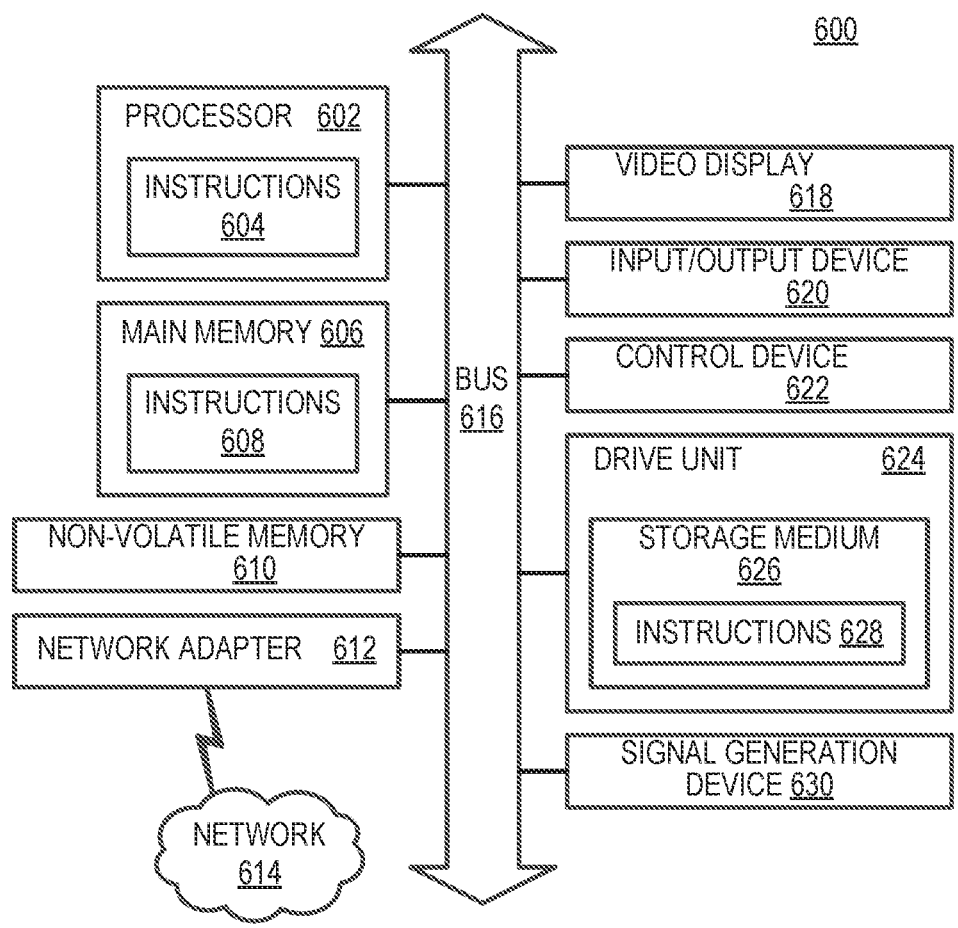
FIG. 6 is a block diagram illustrating an example of a processing system in which at least some operations described herein can be implemented.

FIG. 6 is a block diagram illustrating an example of a processing system 600 in which at least some operations described herein can be implemented. For example, some components of the processing system 600 may be hosted on a network-accessible server system (e.g., network-accessible server system 106 of FIG. 1).

The processing system 600 may include one or more central processing units ("processors") 602, main memory 606, non-volatile memory 610, network adapter 612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 600 may share a similar computer processor architecture as that of a desktop computer, tablet computer, personal digital assistant (PDA), mobile phone, game console, music player, wearable field device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a network-accessible server system, the method comprising:
  receiving a query, the query representing a request for information from an expert;
  parsing the query to discover text of the query;
  determining, by a processor, query attributes by inspecting the text of the query, wherein the query attributes identify a meaning of the query;
  generating an attribute graph that includes a plotting of the query attributes and a plurality of attributes associated with a pool of experts;
  determining that an attribute associated with a first expert is within a threshold proximity on the attribute graph to any of the query attributes;
  mining a third-party server to identify a first event;
  applying natural language processing to a description associated with the first event by parsing the first event to build a first event parse tree;
  comparing the first event parse tree with a repository of known attribute keywords to determine attributes of the first event;
  updating the attribute graph to include the attributes of the first event;
  determining a similarity between a first attribute of the first event and a first query attribute by identifying a distance between the first attribute of the first event and the first query attribute plotted on the attribute graph;
  transmitting the query and the first event to the first expert based on determining that the attribute associated with the first expert is within the threshold proximity on the attribute graph to the first query attribute;
  correlating the first event with a spike in online activity; and
  classifying the first event as a major event based on determining that the spike in online activity exceeds a threshold level.

2. The method of claim 1, wherein the first event is a news article, blog post, or social media post.

3. The method of claim 1, further comprising:
  plotting a geographic location attribute of the first expert on the attribute graph;
  comparing a proximity on the attribute graph between the geographic location attribute of the first expert and a geographic location attribute included in the query attributes; and
  determining that the geographic location attribute of the first expert and the geographic location attribute included in the query attributes are within the threshold proximity on the attribute graph.

4. The method of claim 1, further comprising:
  determining a client attribute of a client based on keywords associated with a client profile; and
  plotting the client attribute on the attribute graph,
  wherein transmitting the query to the first expert is further based on determining that the attribute of the first expert is within a second threshold proximity to the client attribute on the attribute graph.

5. The method of claim 4, wherein the client attribute is associated with a previous query received from a client device associated with the client.

6. The method of claim 1, wherein the attribute associated with the first expert is identified based on a profile keyword associated with an expert profile of the first expert or a project keyword associated with a previous project performed by the first expert.

7. The method of claim 6, wherein the attribute associated with the first expert is identified based on the profile keyword and the project keyword, and
wherein the attribute associated with the first expert is identified according to a first weight associated with the profile keyword and a second weight associated with the project keyword.

8. The method of claim 1, wherein the attribute associated with the first expert is identified based on a ratio between a first number of expert keywords of an expert profile and a second number of project keywords of a project description.

9. The method of claim 1, further comprising:
calculating a score for each expert of the pool of experts, wherein calculating the score includes:
determining a distance between a query attribute and a plurality of attributes of the expert to generate a plurality of distances;
assigning a weight to each of the plurality of distances; and
summing the plurality distances adjusted by the weight of each of the plurality of distances.

10. The method of claim 9, further comprising:
generating a ranked list of experts in an order based on the calculated scores.

11. The method of claim 9, further comprising:
modifying a weight assigned to a distance of the plurality of distances based on historical data relating to previous connections between a client and the pool of experts.

12. The method of claim 1, further comprising:
determining a response accuracy score of a response to the query by analyzing characteristics of the response and a similarity between the response and the first query attribute; and
forwarding a response to the query based on determining that the response accuracy score exceeds a threshold score.

13. A network-accessible server system, comprising:
a processor; and
a memory that includes instructions to selectively distribute a query to a first expert,
wherein the instructions, when executed by the processor, cause the server system to:
receive the query representing a request for information;
parse the query to discover text of the query;
determine query attributes by inspecting the text of the query, wherein the query attributes identify a meaning of the query;
generate an attribute graph that includes a plotting of the query attributes and a plurality of attributes associated with a pool of experts;
determine that an attribute associated with the first expert is within a threshold proximity on the attribute graph to any of the query attributes;
mine a third-party server to identify a first event;
apply natural language processing to a description associated with the first event by parsing the first event to build a first event parse tree;
compare the first event parse tree with a repository of known attribute keywords to determine attributes of the first event;
update the attribute graph to include the attributes of the first event;
determine a similarity between a first attribute of the first event and a first query attribute by identifying a distance between the first attribute of the first event and the first query attribute plotted on the attribute graph;
transmit the query and the first event to the first expert based on determining that the attribute associated with the first expert is within the threshold proximity on the attribute graph to the first query attribute;
correlate the first event with a spike in online activity; and
classify the first event as a major event based on determining that the spike in online activity exceeds a threshold level.

14. The network-accessible server system of claim 13, wherein the attribute associated with the first expert is determined to be within the threshold proximity on the attribute graph to a query attribute based on a Euclidean distance between the attribute associated with the first expert and the query attribute.

15. The network-accessible server system of claim 13, wherein the instructions further cause the server system to:
determine a client attribute based on keywords associated with a client profile; and
plot the client attribute on the attribute graph,
wherein the query is assigned to the first expert further based on determining that the attribute of the first expert is within a second threshold proximity to the client attribute on the attribute graph.

16. The network-accessible server system of claim 13, wherein the instructions further cause the server system to:
plot a geographic location attribute of the first expert on the attribute graph;
compare a proximity on the attribute graph between the geographic location attribute of the first expert and a geographic location attribute included in the query attributes; and
determine that the geographic location attribute of the first expert and the geographic location attribute included in the query attributes are within the threshold proximity on the attribute graph.

17. The network-accessible server system of claim 13, wherein the instructions further cause the server system to:
determine a client attribute based on keywords associated with a client profile; and
plot the client attribute on the attribute graph,
wherein transmitting the query to the first expert is further based on determining that the attribute of the first expert is within a second threshold proximity to the client attribute on the attribute graph.

18. The network-accessible server system of claim 13, wherein the attribute associated with the first expert is identified based on a ratio between a first number of expert keywords of an expert profile and a second number of project keywords of a project description.

19. The network-accessible server system of claim 13, wherein the instructions further cause the server system to:
calculating a score for each expert of the pool of experts, wherein calculating the score includes:
determining a distance between a query attribute and a plurality of attributes of the expert to generate a plurality of distances;
assigning a weight to each of the plurality of distances; and summing the plurality distances adjusted by the weight of each of the plurality of distances.

20. A non-transitory computer-readable medium storing instructions, execution of which by a processor of a computing system causes the computing system to perform operations comprising:

receiving a query, the query representing a request for information from an expert;

parsing the query to discover text of the query;

determining, by a processor, query attributes by inspecting the text of the query, wherein the query attributes identify a meaning of the query;

generating an attribute graph that includes a plotting of the query attributes and a plurality of attributes associated with a pool of experts;

determining that an attribute associated with a first expert is within a threshold proximity on the attribute graph to any of the query attributes;

mining a third-party server to identify a first event;

applying natural language processing to a description associated with the first event by parsing the first event to build a first event parse tree;

comparing the first event parse tree with a repository of known attribute keywords to determine attributes of the first event;

updating the attribute graph to include the attributes of the first event;

determining a similarity between a first attribute of the first event and a first query attribute by identifying a distance between the first attribute of the first event and the first query attribute plotted on the attribute graph;

transmitting the query and the first event to the first expert based on determining that the attribute associated with the first expert is within the threshold proximity on the attribute graph to the first query attribute;

correlating the first event with a spike in online activity; and classifying the first event as a major event based on determining that the spike in online activity exceeds a threshold level.

* * * * *